No. 736,479.

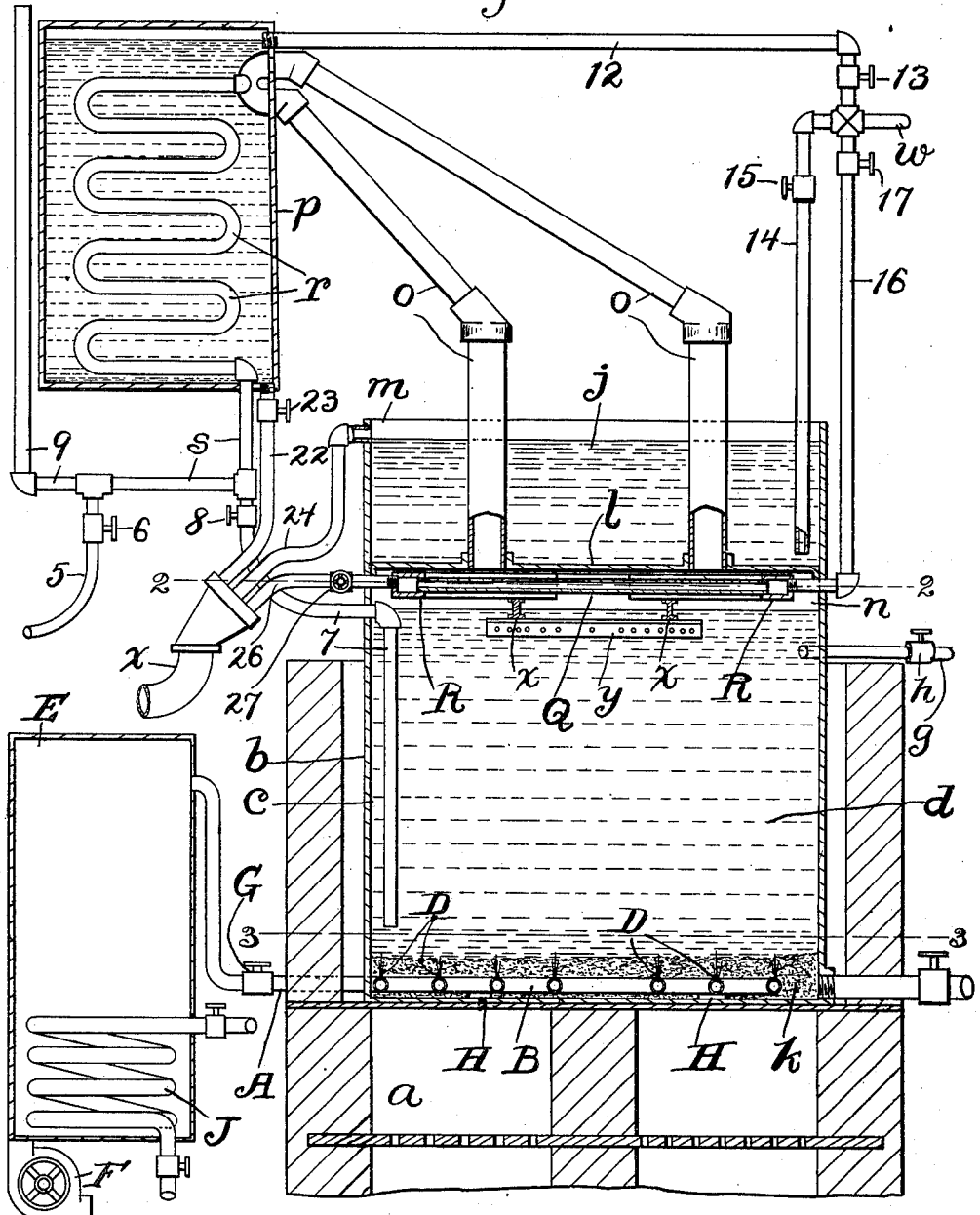

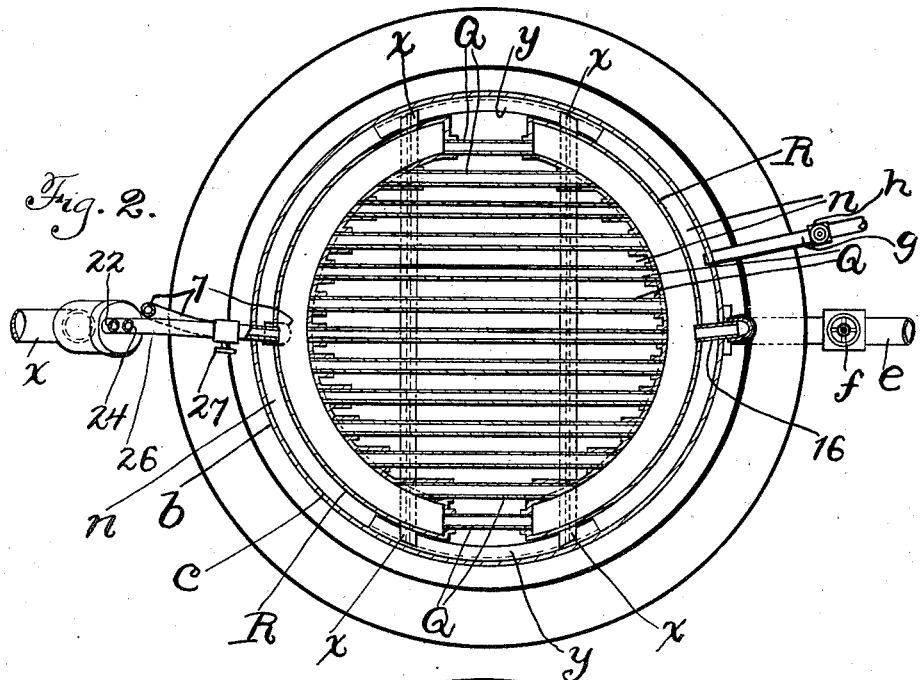
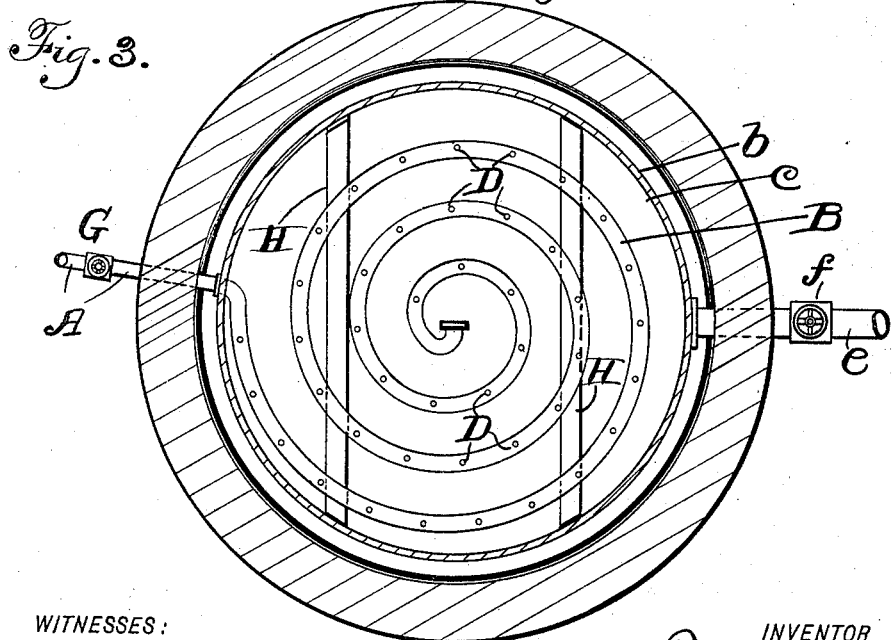

Patented August 18, 1903.

UNITED STATES PATENT OFFICE.

FRIEDRICH BERG, OF WARRENSVILLE, OHIO.

PROCESS OF DEODORIZING OR PURIFYING PETROLEUM.

SPECIFICATION forming part of Letters Patent No. 736,479, dated August 18, 1903.

Application filed December 29, 1902. Serial No. 136,954. (No specimens.)

*To all whom it may concern:*

Be it known that I, FRIEDRICH BERG, a citizen of the United States of America, residing in Warrensville township, in the county of Cuyahoga and State of Ohio, have invented certain new and useful Improvements in Processes of Deodorizing or Purifying Petroleum; and I hereby declare the following to be a full, clear, and exact description of the invention, such as will enable others skilled in the art to which it pertains to make and use the same.

This invention relates to improvements in deodorizing or purifying crude petroleum and its products containing sulfurous compounds or impurities.

The primary object of this invention is to provide apparatus whereby crude petroleum can be treated to economically effect a material increase in the production or yield from a given body of crude oil of the highest grade of illuminating-oil.

In the accompanying drawings, Figure 1 is a side elevation, mostly in section, of apparatus suitable for use in carrying out the said invention. Fig. 2 is a top plan, in horizontal section, on line 2 2, Fig. 1. Fig. 3 is a top plan, in horizontal section, on line 3 3, Fig. 1. The oil-body and the purifying agent are not shown in Figs. 2 and 3.

Referring to the drawings, $a$ designates a furnace employed to heat the oil supplied to the purifying-chamber $c$, formed by and within the lower and central portion of a tank $b$, and $d$ represents a body of impure oil put into the said chamber for purification. The tank $b$ is exposed in any approved manner to the fire-chamber or path of the products of combustion of a furnace $a$. The tank $b$ is provided at the bottom with a valved drain-pipe $e$, which communicates with the chamber $c$ and has a normally closed valve $f$. The tank $b$ is provided at the top with an inlet for accommodating the passage of oil or liquid into the chamber $c$, which inlet is formed by a pipe $g$, which discharges into the said chamber and has a normally closed valve $h$. The chemicals or alkali or substance $k$—such, for instance, as caustic soda in solution—with which the oil is to be deodorized or purified is supplied to the chamber $c$ in any approved manner and can be introduced into the said chamber through the pipe $g$. The caustic soda or purifying agent supplied to the chamber $c$ being heavier than the oil settles upon and over the bottom of the said chamber, and enough of the said purifying agent is fed into the tank to form a thick layer upon the said bottom. This layer protects the body of oil within the said chamber from being overheated at the bottom by the exposure of the said bottom to the fire of the furnace. The tank $b$ extends above the chamber $c$, and a metal diaphragm $l$, which forms the top of the said chamber, is located a suitable distance below the upper extremity of and within the tank and forms the bottom of the condenser-forming water-chamber $m$, supplied with water $j$. The body of oil $d$ which is to be purified is shown only in Fig. 1 and does not fill the tank below the diaphragm $l$. A vapor-receiving space $n$ is left, therefore, between the level of the said oil-body and the said diaphragm. Two vapor-conducting pipes $o$ are in open relation at the diaphragm $l$ with the vapor-space $n$ or upper end of the chamber $c$ and extend upwardly from the said diaphragm through the chamber $m$ to the water containing or cooling chamber of the condenser $p$, arranged at an elevation above the chamber $c$. The pipes $o$ connect and communicate with the receiving end of a series of coils $r$, submerged within the water-chamber of the condenser $p$, and the opposite or discharging end of the said series of coils is connected and communicates with a pipe $s$, which extends downwardly from and outside of the said condenser and has three branches 5, 7, and 9. The branch pipe 5 extends downwardly to any place desired externally of the chamber $c$ and has a normally closed valve 6. The branch pipe 7 extends and discharges into the lower portion of the chamber $c$ and has a normally closed valve 8. The branch pipe 9 extends upwardly to the upper end of the condenser $p$. A cold-water-supply pipe $w$ has three branches 12, 14, and 16. The branch pipe 12 discharges into the water-chamber of the condenser $p$ and has a normally closed valve 13. The branch pipe 14 discharges into the lower end of the water-chamber $m$ and has a normally closed valve 15.

Within the vapor-space forming upper end of the chamber $c$ and arranged in a horizontal plane, preferably in close proximity to the lower side of the discharge $l$ is a considerable number of parallel pipe-sections Q, (see Figs. 1 and 2,) which are arranged in a horizontal plane and a short distance apart laterally. The pipe-sections Q extend between and connect together and communicate with two corresponding manifolds or pipe-fittings R, which are arranged in a horizontal plane within opposite sides, respectively, of the vapor-space $n$. The manifolds R extend circumferentially of the tank $b$ and rest upon I-beams $x$, which in turn rest upon angle-plates $y$, which are secured to the said tank. One of the manifolds R is placed in open relation centrally between its ends with another branch pipe 16 of the water-supply tank $w$, and the other manifold R is placed in open relation centrally between its ends with a branch 26 of a water-conducting pipe $x$, which is arranged externally of the tank $b$. The branch pipe 16 has a normally closed valve 17 and discharges into the connected manifold R. The water-conducting pipe $x$ extends to any place where water is used, and the branch 26 of the said pipe $x$ has a normally closed valve 27. The pipe $x$ has two other branches 22 and 24. The branch pipe 22 communicates with the lower end of the water-chamber of the condenser $p$ and is provided with a valve 23. The branch pipe 24 is an overflow-pipe communicating with the upper end of the water-chamber $m$.

An air-conducting pipe A (see Figs. 1 and 3) extends into the lower end of the chamber $c$ and terminates within the said chamber in a perforated spiral coil B, having upwardly-discharging orifices D. The pipe A communicates with the chamber of a compressed-hot-air reservoir E, and an air-pump F discharges into the said reservoir and is operated whenever required to maintain the air within the said reservoir under the pressure desired. The pipe A is provided between the reservoir E and the tank $b$ with a normally closed valve G. The coil B rests upon two parallel bars H, which rest upon and extend transversely of the bottom of the chamber $c$.

A steam radiator or heater J is contained within the reservoir E and operated in any approved manner.

The operation of the hereinbefore-described apparatus is as follows: The crude petroleum or crude oil which is to be deodorized or purified is run into the chamber $c$ through the pipe $g$ upon opening the valve $h$ until the oil-level rises to within about fifteen inches of the pipe-section Q. The caustic soda or purifying agent may be fed into the said chamber through said pipe $g$ or in any other approved manner. Caustic soda of 35° Baumé is preferably used, and the oil and the caustic soda are introduced into the chamber $c$ in the proportions, measured by volume, of one part of the caustic soda to forty parts of the oil. The furnace $a$ is then fired until the temperature of the oil is considerably above 212° Fahrenheit, and preferably until the said temperature is from 275° to 300° Fahrenheit, and kept fired to maintain the said temperature five or six hours, during which time the oil is continuously and uninterruptedly treated and converted from a liquid to a vaporous state, and vice versa, within the chamber $c$. The valve $h$ is of course closed when the chamber $c$ has been supplied with the oil and caustic soda. Preparatory to the vaporizing of oil within the chamber $c$ the valves 13, 15, and 17 are opened to supply the chambers $m$ and $p$ and the manifolds R and pipe-sections Q with water. The chamber $p$ becomes filled with water, and then upon opening the valve 23 water flows from the said chamber through the pipe 22 into the pipe $x$, and upon opening the valve 27 water flows from the pipe 16 through the pipe-sections Q and through the pipe 26 to the pipe $x$. Water as soon as the water-level within the chamber $m$ rises opposite the upper end of the pipe 24 flows off through the said pipe to the pipe $x$. The water-inlets of the chambers $m$ and $p$ and manifolds R and pipe-sections Q are as large as the water-outlets of the said chambers, manifolds, and pipe-sections, respectively, so that the said chambers $p$ and $m$ and the said manifolds R and pipe-sections Q remain full of water as soon as filled with water during the operation of the apparatus, and the resulting water circulation through the said pipe-sections and manifolds and upwardly through the chamber $m$ is instrumental in keeping the diaphragm $l$ and the said manifolds R and pipe-sections Q in a cool condition, and the said manifolds R and pipe-sections Q form an immensely powerful condensing apparatus within the upper end or vapor-space $n$ of the oil-vaporizing chamber $c$. The oil-vapors and alkali-vapors which arise from the body of oil undergoing treatment within the chamber $c$ impinge against the cool pipe-sections Q, manifolds R, and diaphragm $l$ and are largely condensed or liquefied within the upper end or vapor-space $n$ of the vaporizing-chamber $c$ by thus impinging against the said pipe-sections and manifolds and are almost entirely condensed or liquefied by the combined condensing powers of the said diaphragm, manifolds, and pipe-sections. The escape of vapors from the vapor-space $n$ into the pipes $o$ is almost entirely avoided, and consequently the purifying agent is utilized advantageously and economically, and the decomposition of sulfurous compounds or impurities in the oil undergoing purification is economically carried on to such an extent that a material increase in the percentage of high-grade illuminating-oil obtained from any given body of crude oil is obtained. Any condensable vapors or gases which may escape condensation within the vapor-space $n$ and air ascending through the body of oil and through the said space upon opening the valve G of the pipe A to permit heated air under pressure to the oil-body through the perforated coil B rise into the pipe-sections o. Any liquid resulting from condensation of gases or vapors within the pipe-sections o flows adown the said pipes back to the body of oil within the chamber c. Any condensable vapors or gases which may escape condensation within the pipes o pass into the coils r, wherein they will likely be condensed or liquefied, and the small or inconsiderable quantity of liquid resulting from condensation in the coils r will gravitate through the pipe s and is fed to the chamber c through the branch pipe 7 upon opening the valve 8 or through the pipe 5 upon opening the valve 6. Air and non-condensable gases pass off through the pipe 9.

All joints where leakage must not occur are of course suitably packed and rendered fluid-tight; but packing of joints is too well known to require description and illustration in this application.

The process carried out by the apparatus hereinbefore described consists, essentially, in many times converting the oil and vaporizable and condensable alkali or purifying agent from a liquid to a vaporous or gaseous state, and vice versa, next over the body of oil being vaporized and within a closed chamber having an outlet or outlets—such, for instance, as the pipes o—for air and non-condensable gases and vapors, and maintaining a temperature considerably above 212° Fahrenheit within the said chamber during the process, so that the production or yield of the highest grade of illuminating product from the said body of oil is inexpensively materially increased.

The caustic soda or alkali in solution upon the bottom of the chamber c being exposed directly to the heat radiating from the furnace a will be heated to at least 340° Fahrenheit, and consequently will be in a boiling state during the operation of the hereinbefore-described process. The solution of caustic soda of 35° Baumé will obviously boil at 340° Fahrenheit, and not unlikely the alkaline layer will be heated at the bottom to a temperature as high as 400° Fahrenheit in heating the body of oil to a temperature considerably above 212° Fahrenheit—that is, if the average temperature of the body of oil undergoing treatment were 275° Fahrenheit, or even 250° Fahrenheit, the average temperature of the alkaline layer would be at least 340° Fahrenheit, as required to boil a solution of caustic soda of 35° Baumé. Alkaline vapors arise from the boiling alkaline layer through the body of oil undergoing treatment and commingle with the oil-vapors arising from the said body, and both vapors are many times converted from a liquid to a vaporous or gaseous state, and vice versa, during the process.

The length of time required in carrying out the process on any given body of oil will depend upon the percentage of sulfur or sulfurous compounds or impurities in the crude oil, and the time will be longer or shorter according as the percentage of the said compounds or impurities is greater or less. For instance, I have attained good results in treating some Northern Ohio crude petroleum for about four hours. On the other hand, I have treated Lima oil, also an Ohio oil, which required six hours of treatment, only because, however, the latter carried a larger percentage of sulfur or sulfurous compounds.

Any crude petroleum by its treatment by the process hereinbefore described becomes a product which is in the best possible condition for distillation and which upon a distillation will yield a remarkably high percentage of the highest grade of illuminating-oil. The product resulting from a treatment of the crude petroleum by the said process is also more desirable for use in the manufacture of gas or for heating purposes than crude oil not treated by the said process. For illuminating purposes distillation is of course necessary after treatment of the crude oil by my improved process.

What I claim is—

1. An improvement in purifying or deodorizing petroleum, comprising the treatment of the oil with an alkali for several hours at a temperature considerably above 212° Fahrenheit in a closed chamber having an air-outlet at the top, and condensing, within the upper end of said chamber next over the body of oil undergoing treatment, approximately all of the condensable vapors arising from the oil-body and alkali during the said treatment and repeatedly converting the oil from a liquid to a vaporous or gaseous state and vice versa during the said treatment within the said upper end of the said chamber.

2. An improvement in purifying or deodorizing petroleum, comprising the treatment of the oil with an alkali at a temperature considerably above 212° Fahrenheit in a closed chamber having an outlet at the top for the escape of air and gases and repeatedly converting the vaporizable liquid, during the said treatment within the said chamber, from a liquid to a vaporous or gaseous state and vice versa.

3. An improvement in purifying or deodorizing petroleum, comprising the treatment of the oil with an alkali for several hours at a temperature of from 275° to 300° Fahrenheit in a closed chamber having an outlet at the top for air and gases, and condensing, within the upper end of said chamber, the larger portion of the condensable vapors arising within the said chamber during the aforesaid treatment.

4. An improvement in purifying or deodorizing petroleum, comprising the treatment of the oil with an alkali for several hours at a temperature considerably above 212° Fahrenheit in a closed chamber having an air-outlet at the top for air and gases, and condensing within the upper end of the said chamber approximately all of the condensable vapors arising from the oil-body and alkali during the aforesaid treatment and passing heated air under pressure upwardly through the body of oil during the said treatment.

In testimony whereof I sign the foregoing specification, in the presence of two witnesses, this 20th day of December, 1902, at Cleveland, Ohio.

FRIEDRICH BERG.

Witnesses:
C. H. DORER,
TELSA SCHWARTZ.